(12) United States Patent
Walker et al.

(10) Patent No.: US 7,543,113 B2
(45) Date of Patent: Jun. 2, 2009

(54) CACHE MEMORY SYSTEM AND METHOD CAPABLE OF ADAPTIVELY ACCOMMODATING VARIOUS MEMORY LINE SIZES

(75) Inventors: Shawn Walker, Fort Collins, CO (US);
Donald C. Soltis, Jr., Fort Collins, CO (US); Karl Brummel, Chicago, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 701 days.

(21) Appl. No.: 10/883,860

(22) Filed: Jul. 2, 2004

(65) Prior Publication Data

US 2006/0004962 A1    Jan. 5, 2006

(51) Int. Cl.
*G06F 12/00* (2006.01)
*G06F 13/00* (2006.01)
*G06F 13/28* (2006.01)

(52) U.S. Cl. .................................. 711/128; 711/173
(58) Field of Classification Search .................. 711/128
See application file for complete search history.

(56) References Cited

U.S. PATENT DOCUMENTS

| 5,301,296 | A | * | 4/1994 | Mohri et al. | 711/128 |
| 5,367,653 | A | * | 11/1994 | Coyle et al. | 711/128 |
| 5,367,659 | A | * | 11/1994 | Iyengar et al. | 711/136 |
| 5,586,303 | A | | 12/1996 | Willenz et al. | |
| 5,854,761 | A | * | 12/1998 | Patel et al. | 365/49 |
| 6,505,284 | B1 | | 1/2003 | Rabinoxici et al. | |
| 6,587,923 | B1 | | 7/2003 | Benveniste et al. | |
| 6,732,234 | B1 | | 5/2004 | Rowlands et al. | |
| 6,748,492 | B1 | * | 6/2004 | Rowlands et al. | 711/128 |
| 6,751,700 | B2 | | 6/2004 | Donoghue et al. | |
| 6,792,508 | B1 | * | 9/2004 | Chauvel et al. | 711/128 |
| 6,826,652 | B1 | * | 11/2004 | Chauvel et al. | 711/128 |
| 6,944,713 | B2 | * | 9/2005 | Clark et al. | 711/128 |
| 2003/0208658 | A1 | * | 11/2003 | Magoshi | 711/122 |
| 2004/0030834 | A1 | * | 2/2004 | Sharma | 711/122 |
| 2004/0078523 | A1 | * | 4/2004 | Chauvel et al. | 711/128 |

* cited by examiner

*Primary Examiner*—Kevin L Ellis
*Assistant Examiner*—Prasith Thammavong (57) ABSTRACT

A cache memory system capable of adaptively accommodating various memory line sizes comprises cache memory and cache logic. The cache memory has sets of ways. The cache logic is configured to request a memory line in response to a cache miss, and the memory line represents a portion of a way line. The cache logic is configured to select one of the ways based on which portion of the way line is represented by the memory line. The cache logic is further configured to store the memory line in the selected way.

15 Claims, 5 Drawing Sheets

FIG. 7

CACHE MEMORY SYSTEM AND METHOD CAPABLE OF ADAPTIVELY ACCOMMODATING VARIOUS MEMORY LINE SIZES

RELATED ART

In processing instructions of a computer program, it is often necessary for a processor to retrieve data from memory. The retrieval of such data takes a finite amount of time, and delays in processing instructions can be caused by the processor waiting on data to be retrieved from memory. In an effort to minimize such delays, most processors utilize a local memory structure, referred to as a "cache."

The cache provides a local storage area for the processor such that data can be loaded into the cache and reused by the processor without having to repeatedly retrieve the data from other memory areas. The amount of time required to access data stored in the cache is generally much less than the time required to access data from other memory within a computer system. Thus, if data requested by a processor is available in the cache, then the amount of time required to provide the data to the processor can be significantly decreased by retrieving the data from the cache rather than searching for and retrieving the data from other memory.

Therefore, when a processor submits a data request, the cache is usually searched to determine whether the most recent version of the requested data is stored in the cache. If so, the data is retrieved from cache and provided to the processor. However, if the most recent version of the requested data is not available in the cache, then other areas of the computer system's memory are searched for the requested data. Once the requested data is located, this data is retrieved and provided to the processor. The data is also stored in the cache so that, if the data is later requested, it can be retrieved from the cache until such data in the cache is overwritten or invalidated.

Most caches have a limited number of entries, referred to as "ways," where data can be stored. Further, the ways are normally grouped into sets. Each set typically has the same number of ways, and each way typically has the same bit length. For example, a cache that has 8 ways per set and n number of sets has 8n possible entries or ways where data can be stored. Thus, if each way is able to store 128 bytes, then the cache is able to store up to 1024n bytes of information. Note the term "way line" generally refers to a separately addressable block of data of sufficient size for filling a single way in the cache. Access to the way lines is provided by the use of addresses, each of which normally comprises a tag, an index, and an offset. The tag and index uniquely identify a particular way line, and the offset uniquely identifies a particular byte within the way line.

In many computer systems, the cache is designed such that the byte lengths of the ways match the byte length of memory lines. A "memory line" refers to a separately addressable block of data capable of being retrieved from memory and transmitted over the system interface in a single transmit operation (e.g., as a single data word). The byte lengths of the memory lines in a computer system are usually limited by the system's hardware resources. For example, the size of the system interface limits the computer system's memory line size. Further, memory controllers that control the storage and retrieval of data to and from memory are usually hardwired to handle one memory line for each read and write operation performed by the memory controllers.

Since data is normally stored to and retrieved from memory on a memory line basis, each way in a cache is normally selected such that the size of a way line equals the size of a memory line. Thus, a retrieved memory line may be stored as a way line in and completely fill a single way.

However, all computer systems do not use the same memory line size. Thus, the number of computer systems compatible with a given processor and cache configuration is limited. As an example, a cache designed for a computer system that employs 64 byte memory lines and, therefore, a 64 byte system interface may be incompatible with a computer system that employs 128 byte memory lines and vice versa. In general, it is desirable for a cache to be adaptable to accommodate different memory line sizes so that the range of computer systems in which the cache may be used is increased.

Some caches have been designed to accommodate memory line sizes that differ by a factor of two. For example, a cache having ways that are 128 bytes in length is able to receive and store 128 byte memory lines. In this regard, when the cache receives a read request that requests a particular byte of data, cache logic within the cache determines whether the requested data is available in the cache. A cache hit occurs when the requested data is in the cache and can be provided to the processor without searching other memory for the requested data. A cache miss occurs when the requested data is not available in the cache and other memory areas must be searched to locate the requested data.

In response to a cache miss, the cache logic transmits a read request to a memory controller. Based on the read request, the memory controller retrieves the 128 byte memory line that contains the requested data and transmits this memory line to the cache, which stores the 128 byte memory line in a single way. In other embodiments, the aforedescribed cache can be implemented in a computer system that employs 64 byte memory lines. In such an embodiment, cache logic within the cache sends two read requests for each cache miss. In this regard, a first one of the memory requests causes retrieval of a 64 byte memory line that includes the data requested by the processor. This 64 byte memory line represents half of a way line and is stored in half of a particular cache way of the cache. To fill the particular cache way with the other half of the way line, the second read request causes retrieval of a 64 byte memory line that is contiguous with the other 64 byte memory line retrieved by the first read request. The 64 byte memory line retrieved by the second read request is stored in the same way as the 64 byte memory line retrieved by the first read request such that the entire way is filled with valid data.

Filling the entire way with valid data, as described above, helps to ensure that valid data is retrieved from the cache in response to a cache hit regardless of which portion of a way contains the requested data. However, generating multiple read requests to ensure that each way is completely filled with valid data, as described above, undesirably introduces system interface delays that can adversely impact the performance of the computer system. Techniques for reducing or eliminating such delays are generally desirable.

SUMMARY OF THE DISCLOSURE

Generally, embodiments of the present disclosure provide systems and methods capable of adaptively accommodating various memory line sizes.

A cache memory system in accordance with an exemplary embodiment of the present disclosure comprises cache memory and cache logic. The cache memory has sets of ways. The cache logic is configured to request a memory line in response to a cache miss, and the memory line represents a portion of a way line. The cache logic is configured to select one of the ways based on which portion of the way line is represented by the memory line. The cache logic is further configured to store the memory line in the selected way.

A cache memory system in accordance with another embodiment of the present disclosure comprises cache memory, compare logic, and hit logic. The cache memory has a tag array and a data array, and the tag compare logic is configured to receive a tag of an address associated with a read request and a tag retrieved from the tag array based on an index of the address. The tag compare logic is further configured to compare the received tags and to transmit a hit signal based on a comparison of the received tags. The hit signal indicates whether an entry of the data array is storing data from a memory block identified by the tag and index of the address. The hit logic is configured to manipulate the transmitted hit signal based on whether the data from the memory block includes data requested by the read request.

A cache memory system in accordance with yet another embodiment of the present disclosure comprises cache memory and cache logic. The cache memory has sets of ways, and the cache logic is capable of operating in at least a first mode of operation and a second mode of operation. The cache logic is configured to receive a first plurality of memory lines when operating in the first mode of operation and to receive a second plurality of memory lines when operating in the second mode of operation. Each of the first plurality of memory lines has a first size, and each of the second plurality of memory lines has a second size. The cache logic is further configured such that each of the first plurality of memory lines is assigned to and fully associative within a respective one of the sets and such that each of the second plurality of memory lines is assigned to and partially associative within a respective one of the sets.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally relate to caches capable of adaptively accommodating various memory line sizes. A cache in accordance with an exemplary embodiment of the present disclosure is capable of operating in at least two modes of operation depending on the size of the memory lines to be interfaced with the cache. The cache comprises memory having entries or ways of n bytes. In a first mode of operation, the cache is implemented in a computer system that provides n-byte memory lines. In this mode of operation, the cache submits, for each cache miss, a read request to a memory system. In response to the read request, a memory line of n-bytes representing a full way line is retrieved from memory and transmitted to the cache via a system interface. The cache stores the n-byte memory line received from the system interface into a single way of a set identified by the address.

In a second mode of operation, the cache is implemented in a computer system that provides memory lines of a smaller size (e.g., (n/2)-byte memory lines). In the second mode of operation, the cache submits, for each cache miss, a read request having an address to a memory system. In response to the read request and based on the address, a memory line of x bytes, where x is less than n, representing only a portion of a way line is retrieved from memory and transmitted to cache via a system interface. Depending on which portion of the way line is retrieved, the cache selects one of the ways of the set identified by the address and stores the x bytes into the selected way. The cache ensures that, if another portion of the same way line is requested, such other portion will be stored in a different way of the same set. Moreover, any of the x bytes stored in the selected way may later be used to satisfy a read request from a processor regardless of whether the entire way line is stored in the cache. Accordingly, multiple memory reads for a single read request are unnecessary.

Figure 1:
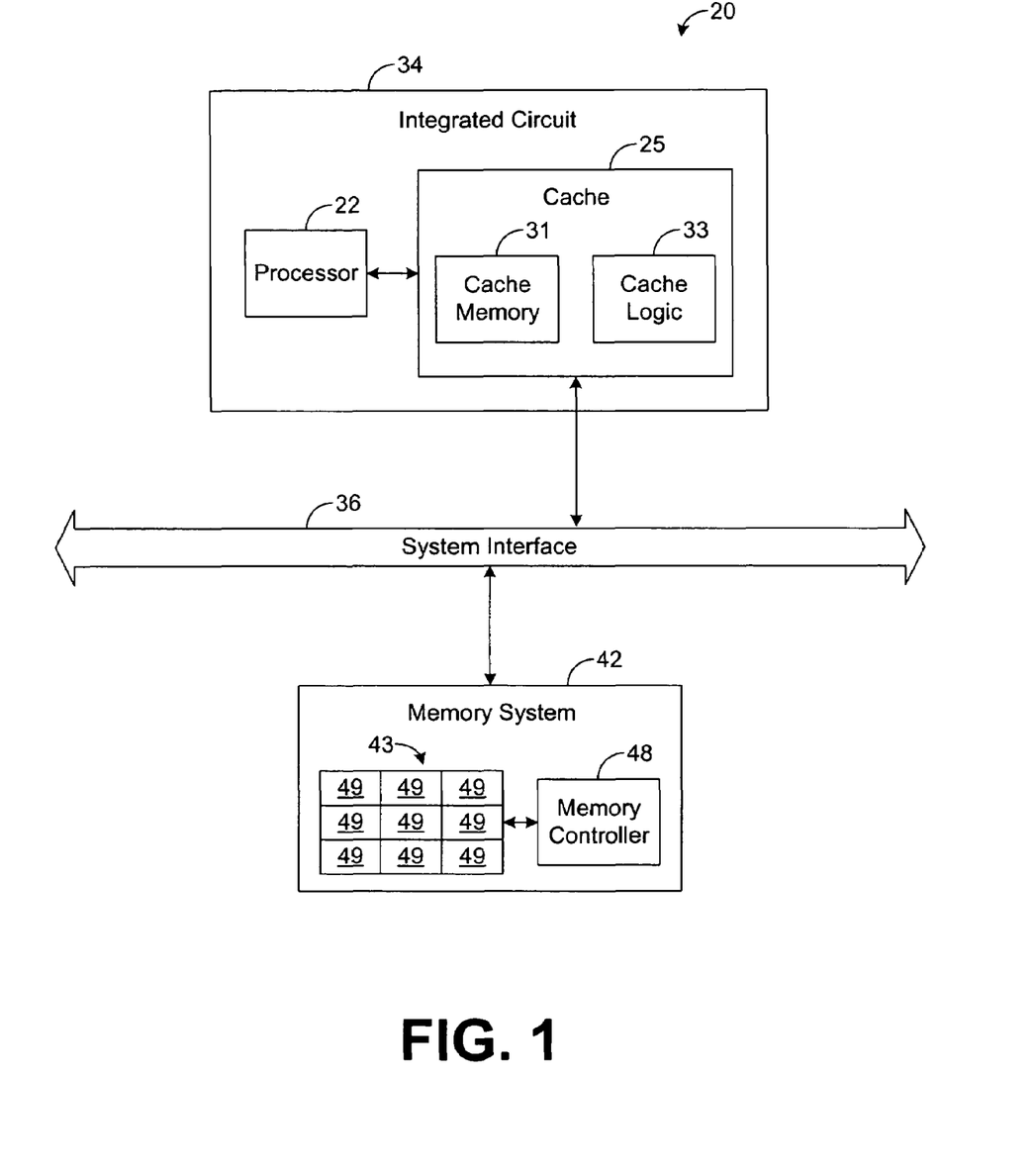
FIG. 1 is a block diagram illustrating a computer system that employs a cache memory system in accordance with an exemplary embodiment of the present disclosure.

FIG. 1 depicts a computer system 20 in accordance with an exemplary embodiment of the present disclosure. The system 20 comprises a processor 22 configured to execute instructions in accordance with well-known instruction processing techniques. The processor 22 is coupled to and in communication with a cache memory system, also referred to as "cache 25." The cache 25 comprises cache memory 31 for temporarily storing data used by the processor 22 and cache logic 33 for controlling the operation and functionality of the cache 25. The cache logic 33 is preferably implemented in hardware, although it is possible to implement portions of the functionality of the cache logic 33 in software, if desired. To reduce the amount of time necessary for the processor 22 to access data in the cache 25, the processor 22 and cache 25 preferably reside in a single integrated circuit 34.

The cache 25 is coupled to a system interface 36, which allows the cache to communicate with other system components, such as one or more memory systems 42. The system interface 36 comprises a number of connections to allow a memory line of n bytes to be communicated in a single transmit operation (e.g., as a single data word) to the cache 25 from memory system 42 or from other resources of the computer system 20.

The memory system 42 comprises memory 43 and one or more memory controllers 48 for controlling the storage and the retrieval of data to and from the memory 43. The memory controller 48 may be implemented in hardware, software, or a combination thereof.

In operation, the processor 22 generates read and write requests while executing instructions of one or more computer programs. A read request refers to an operation that requests data to be retrieved and returned to the processor 22. A write request refers to an operation that requests data to be written to a particular memory location. Each read request comprises an address identifying a location within memory 43 from where the requested data is to be retrieved, and each write request comprises an address identifying a location within memory 43 where data is to be written.

Note that the system 20 may include additional processors and caches (not specifically shown in FIG. 1). Either a memory controller 48 or one of the additional processors may respond to a read request. In this regard, if the data being requested is located in a cache of an additional processor, then the additional processor may respond with the requested data. Otherwise, the requested data is retrieved by a memory controller 48.

Figure 2:
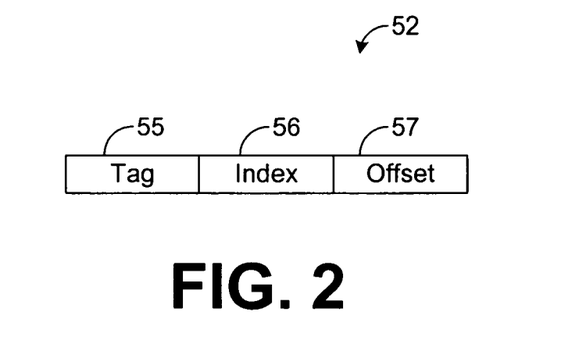
FIG. 2 is a block diagram illustrating an exemplary address that may be used to access data in the computer system depicted by FIG. 1.

As shown by FIG. 2, each address 52 is composed of at least three parts, a tag 55, an index 56, and an offset 57. The tag 55 and index 56 identify a block 49 of memory 43 in which the requested data byte or bytes reside. The size of the memory blocks 49 matches the size of the cache memory 31 such that each memory block 49 defines a different way line. For example, in one embodiment, the length of each way in the cache 25 and each memory block 49 is 128 bytes, although other byte lengths are possible in other embodiments.

The offset 57 uniquely identifies, within the memory block 49 identified by the tag 55 and index 56, the particular byte or bytes that are to be retrieved (in the case of a read request) or overwritten (in case of a write request). Thus, using the tag 55 and index 56 of the address 52 within a read request, it is possible to find the memory block 49 storing the requested data byte or bytes, and using the offset 57, it is possible to find the requested data byte or bytes within the foregoing memory block 49. In some embodiments, the address 52 may also include a size request that identifies the number of bytes being requested, and the size request in conjunction with the offset may be used to identify the requested data byte or bytes.

Figure 3:
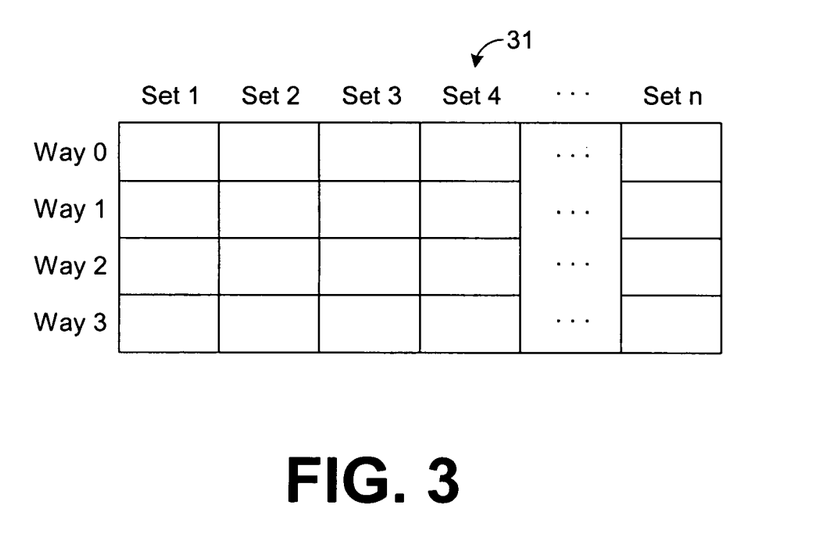
FIG. 3 is a block diagram illustrating cache memory within the system depicted by FIG. 1.

As shown by FIG. 3, the cache memory 31 is segmented into an x number of sets, where x is any positive integer. Each set is composed of a plurality of ways, and each way is a cache memory location where a full way line may be stored. In a preferred embodiment, each set has the same number of ways. In FIG. 3, each set is shown as having four ways for simplicity. However, in other embodiments, other numbers of ways within each set are possible.

The index 56 of address 52 uniquely identifies one of the sets of the cache 25, and multiple addresses may have the same index 56. Thus, way lines from different memory blocks 49 may be stored in the same set.

In one embodiment, the cache 25 is implemented within a system 20 having an interface 36 of sufficient size such that the memory system 42 can transmit n-byte memory lines over the interface 36. Further, each way of the cache 25 preferably has a length of n bytes such that a single memory line fills a single way. Thus, a single memory line representing a full way line can be retrieved from memory 43 and transmitted in a single transmit operation over system interface 36 to cache 25. In such an embodiment, the operation of the cache 25 is similar to that of conventional caches.

In this regard, when the cache 25 receives a read request from the processor 22, the cache logic 33 determines whether the requested data is stored in the cache 25. Note that a cache hit refers to the condition that the requested data is stored in the cache 25 and can be retrieved directly from the cache 25. Further, a cache miss refers to the condition that the requested data is not presently available in the cache 25.

In the event of a cache hit, the cache logic 33 retrieves the requested data from the cache memory 31 and transmits this data to the processor 22. However, in the event of a cache miss, the cache logic 33 transmits a read request over the system interface 36 to the memory system 42. Based on the address 52 in the read request, the memory controller 48 retrieves a memory line representing a full way line that contains the requested data. In this regard, the memory controller 48 retrieves the memory block 49 identified by the tag 55 and index 56 of the received memory address 52. The memory controller 48 then transmits the retrieved way line, along with the address 52 of the read request, over the system interface 36 to the cache 25.

Upon receiving the way line, the cache logic 25 stores the way line in one of the ways of a set identified by the index 56 of the aforementioned address 52. Note that the cache logic 25 also transmits the requested data to the processor 22 in order to satisfy the aforementioned read request previously issued by the processor 22. The requested data may be transmitted before or after the way line is written in the cache memory 31.

Once the way line is written in the cache 25, then future read requests requesting data within the way line may be retrieved directly from the cache 25 without submitting a read request to memory system 42 until the way line is invalidated or overwritten. In this regard, a way line is overwritten when a new way line is stored in the same way. Further, a way line is invalidated when the data defining the way line is no longer the most recent version of such data. For example, a memory block 49 may be updated once the way line from this memory block 49 has been written to the cache 25. If such an update occurs, then the way line is preferably invalidated such that a read request requesting one or more bytes within the way line is retrieved from memory system 42 rather than the previously written way line residing in the cache 25. To invalidate a way line stored in the cache, control data within the cache 25 is manipulated such that a cache miss occurs in response to a read request having an address identifying the memory block 49 from which the way line was previously retrieved.

In another embodiment, the cache 25 is implemented within a system 20 having an interface 36 capable of transmitting memory lines of only (n/2) bytes. For example, if each way in the cache 25 is capable of storing 128 bytes, then the system interface 36 is capable of transmitting 64 byte memory lines. In such an embodiment, the cache logic 33 is configured to allocate half of the ways of each set to an upper half of each way line that may be stored in the set, and the cache logic 33 is configured to allocate the remaining half of the ways in each set to a lower half of each way line that may be stored in the set. Thus, for each way line, the upper half of the way line may be stored in half of the ways of a particular set, and the lower half of the way line may be stored in the other half of the ways of the particular set.

To illustrate the foregoing, assume that the odd ways (i.e., ways 1 and 3) are allocated to the upper halves of the way lines and that the even ways (i.e., ways 0 and 2) are allocated to the lower halves of the way lines, although other allocation schemes are possible in other embodiments. When a read request from processor 22 results in a cache miss, the cache logic 33 transmits the read request over system interface 36 to memory system 42. In response, the memory controller 48 retrieves a memory line representing half of a way line from the memory block 49 identified by the tag 55 and index 56 of the address 52 included in the read request. In this regard, if the offset 57 indicates that the requested data is in the upper half (i.e., the half having the most significant bits) of the identified memory block 49, then the memory controller 48 retrieves the upper half of the way line and transmits the upper half of the way line, along with the address 52 of the read request, over system interface 36 to cache 25. If the offset 57 indicates that the requested data is in the lower half (i.e., the half having the least significant bits) of the identified memory block 49, then the memory controller 48 retrieves the lower half of the way line and transmits the lower half of the way line, along with the address 52 of the read request, over system interface 36 to cache 25.

Upon receipt of the retrieved way line half, the cache logic 33 stores the way line half in one of the ways of the set identified by the index 56 of the address 52 depending on whether the retrieved way line half is the upper or lower half of the way line. In particular, if the way line half is the upper half of the way line, then the cache logic 33 stores the way line half in one of the ways allocated to the upper way line halves (i.e., either way 1 or 3 in the instant example). However, if the way line half is the lower half of the way line, then the cache logic 33 stores the way line half in one of the ways allocated to the lower way line halves (i.e., either way 2 or 4 in the instant example).

Note that the most significant bit of the offset 57 indicates whether the received way line half is an upper way line half or a lower way line half. In this regard, if this bit is asserted, then the received way line half is an upper way line half, and if this bit is deasserted, then the received way line half is a lower way line half. Thus, the cache logic 33 may be configured to select the way that is to store the received way line half based on the offset 57 and, in particular, the most significant bit of the offset 57 in the instant example. In other examples, other portions of the address may be used to select the way that is to store the received way line portion.

Note that if data in the other half of the aforementioned way line (i.e., the non-retrieved half) is requested, then the other half will not be stored in the same way as the retrieved half. It is unnecessary for this other half to be retrieved until a read request identifying data in this other half is issued by the processor 22.

To determine whether there is a cache hit in response to a read request from processor 22, the cache logic 33 determines whether the read request is requesting data in an upper or lower half of a way line. Note that this determination can be made by analyzing the offset 57 and, in particular, the most significant bit of the offset. If the read request is requesting data in an upper half of a way line, then the cache logic 33 determines whether any of the ways allocated to the upper way line halves is storing data associated with the address 52 in the read request. In the instant example, the cache logic 33 determines whether way 1 or 3 in the set identified by the index 56 is storing data identified by the address 52. If so, then the cache logic 33 retrieves the requested data from the appropriate way 1 or 3 and transmits the requested data to the processor 22. Otherwise, the cache logic 33 indicates a cache miss and transmits the read request to memory system 42.

If the read request is requesting data in a lower half of a way line, then the cache logic 33 determines whether any of the ways allocated to the lower way line halves is storing data associated with the address 52 in the read request. In the instant example, the cache logic 33 determines whether way 2 or 4 in the set identified by the index 56 is storing data identified by the address 52. If so, then the cache logic 33 retrieves the requested data from the appropriate way 2 or 4 and transmits the requested data to the processor 22. Otherwise, the cache logic 33 indicates a cache miss and transmits the read request to memory system 42.

Figure 4:
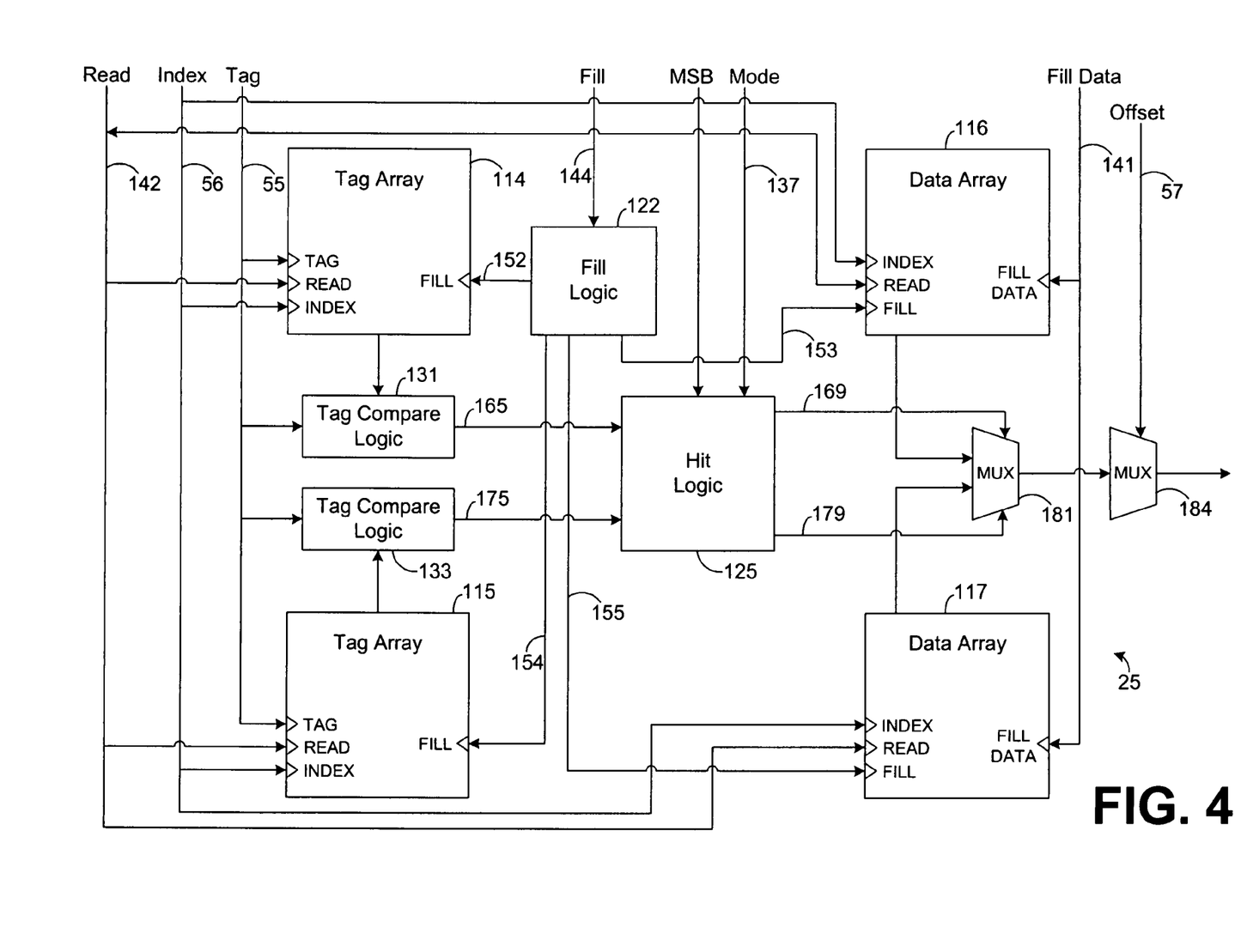
FIG. 4 is a block diagram illustrating an exemplary embodiment of the cache memory system depicted in FIG. 1.

There are various configurations of the cache logic 33 that may be used to implement the aforedescribed functionality. FIG. 4 depicts an exemplary embodiment of the cache 25. For simplicity, the cache 25 of FIG. 4 is described hereafter as having only two ways per set. Thus, each set has only two ways, referred to hereafter as "way 0" and "way 1," respectively. It will be assumed hereafter that, in at least one mode of operation, way 1 is allocated to upper way line halves and way 0 is allocated to lower way line halves. In other embodiments, similar circuitry may be used to implement a cache having a greater number of ways per set.

The cache 25 shown by FIG. 4 has two tag arrays 114 and 115 and two data arrays 116 and 117. Each of the arrays 114-117 is an area of cache memory 31 (FIG. 1) where data can be stored in the cache 25. For example, each array 114-117 may be a separate register, although other configurations of the arrays 114-117 are possible in other embodiments.

The data array 116 is used to implement all ways allocated to the lower way line halves. In the instant example, each entry of the array 116 represents way 0 of a different set. Further, data array 117 is used to implement all ways allocated to the upper way line halves. In the instant example, each entry of the array 117 represents way 1 of a different set.

Each entry of the data array 116 corresponds to an entry of the tag array 114, and each entry of the data array 117 corresponds to an entry of the tag array 115. When at least a portion of a way line is stored in an entry of the data array 116, the tag 55 identifying the memory block 49 (FIG. 1) from where the way line portion was retrieved is stored in the corresponding entry of the tag array 114. Note that the corresponding entries in the data array 116 and tag array 114 are referenced by or, in other words, uniquely identified by the same index 56.

Further, when at least a portion of a way line is stored in an entry of the data array 117, the tag 55 identifying the memory block 49 (FIG. 1) from where the way line portion was retrieved is stored in the corresponding entry of the tag array 115. Note that the corresponding entries in the data array 117 and tag array 117 are referenced by or, in other words, uniquely identified by the same index 56.

The cache 25 depicted by FIG. 4 also comprises fill logic 122, hit logic 125, and tag compare logic 131 and 133. The aforementioned logic 122, 125, 131, and 133 implements a portion of the cache logic 33 depicted in FIG. 1. The fill logic 122 indicates when data from a way line is to be stored in the cache 25. Further, the hit logic 125 and the tag compare logic 131 and 133 operate in conjunction to indicate whether a read request received from the processor 22 results in a cache hit or a cache miss. The operation and functionality of the aforementioned logic 122, 125, 131, and 133 will be described in greater detail below.

A one-bit signal 137, referred to hereafter as "mode signal," is provided to indicate the mode of operation for the cache 25. In this regard, the mode signal is asserted when the cache 25 is implemented in a computer system 20 that is configured to provide the cache 25 n-byte memory lines for storage in the data arrays 116 and 117, where n is the byte length of the ways within the arrays 116 and 117. Such a mode of operation will be referred to hereafter as the "full way line mode of operation." If the cache 25 is implemented in a computer system 20 that is configured to provide the cache 25 with (n/2)-byte memory lines, then the mode signal is deasserted. Such a mode of operation will be referred to hereafter as the "half way line mode of operation." Note that the mode signal 137 may comprise a plurality of bits (e.g., when system 20 is capable of accommodating more than two memory line sizes).

In the embodiments described hereafter, each memory line received by the cache 25 during the full way line mode of operation is fully associative within the set identified by the memory line's address. Further, each memory line received by the cache 25 during another mode of operation in which the memory lines represent portions of way lines (e.g., the half way line mode of operation) is partially associative within the set identified by the memory line's address. As used herein, a memory line is "fully associative" within a set when it can be stored in any way of the set, and a memory line is "partially associative" within a set when it can be stored in only some of the ways of the set.

As an example, in the half way line mode of operation, a memory line representing a lower half of a way line can be stored in any way allocated to lower way line halves in the set identified by the memory line's address. However, the cache logic 33 ensures that such a memory line is not stored in a way allocated to upper way line halves. Since the memory line can be stored in at least one but less than all of the ways of the set identified by the index 56 of its address, the memory line is partially associative within the identified set during the half cache line mode operation.

As shown by FIG. 4, the cache 25 is provided two other one-bit signals 142 and 144 respectively referred to as a "read signal" and "fill signal." The read signal 142, when asserted, indicates that the cache 25 is performing a read operation or, in other words, is attempting to service a read request from the processor 22. The fill signal 144, when asserted, indicates that the cache 25 is performing a fill operation or, in other words, is processing and storing at least a portion of a way line received from memory system 42 (FIG. 1). The performance of read and fill operations will now be described in more detail below.

When the cache 25 receives from memory system 42 a memory line to be stored in the cache 25 during the full way line mode of operation (i.e., when the cache 25 is to perform a fill operation) during the full way line mode of operation, the cache 25 stores the memory line, representing an entire way line, in one of the data arrays 116 or 117. In this regard, the tag 55 and index 56 of the address 52 associated with the way line are transmitted to the arrays 114-117. Further, the fill signal is asserted to indicate that a fill operation is to be performed, and fill data 141 (i.e., the way line to be stored in the cache 25) is provided to the data arrays 116 and 117. The fill logic 122, based on the mode signal, determines that the fill data may be stored in either way 0 or 1. Thus, the fill logic 122 selects between the two available ways 0 or 1 for the optimal way to which the fill data is to be stored.

Note that the fill logic 122 may utilize a replacement algorithm to select the optimal way. In this regard, replacement algorithms strategically select between available ways for performing fill operations in order to reduce the likelihood of cache misses. Such fill algorithms are known in the art and are widely used in conventional caches. The fill logic 122 of FIG. 4 may employ a known or future-developed replacement algorithm to select between available ways when performing fill operations.

If the fill logic 122 selects way 0 to complete the fill operation, then the fill logic 122 asserts fill signals 152 and 153 and deasserts fill signals 154 and 155. When fill signal 152 is asserted, the tag array 114 stores the tag 55 being received by the tag array 114 into the entry identified by the index 56 being received by the tag array 114. Further, when the data array 116 receives an asserted fill signal 153, the data array 116 stores the fill data 141 in the entry identified by the index 56 being received by the data array 116. Thus, if the fill logic 122 selects way 0 to complete the fill operation, the entire way line is stored in data array 116.

If the fill logic 122 selects way 1 to complete the fill operation, then the fill logic 122 deasserts fill signals 152 and 153 and asserts fill signals 154 and 155. When fill signal 154 is asserted, the tag array 115 stores the tag 55 being received by the tag array 115 into the entry identified by the index 56 being received by the tag array 115. Further, when the data array 117 receives an asserted fill signal 155, the data array 117 stores the fill data 141 in the entry identified by the index 56 being received by the data array 117. Thus, if the fill logic 122 selects way 1 to complete the fill operation, the received memory line, representing an entire way line, is stored in data array 117.

When the cache 25 receives from processor 22 a read request (i.e., when the cache 25 is performing a read operation), the cache 25 determines whether the requested data is available in the cache 25 and, if so, retrieves the requested data. In this regard, in responding to a read request, the tag 55 and index 56 of the address 52 included in the read request is transmitted to the tag arrays 114 and 115 and the data arrays 116 and 117. Further, the read signal 142 is asserted. The tag array 114 retrieves the tag stored in the entry identified by the received index 56, and the tag array 114 transmits the retrieved tag to the tag compare logic 131, which also receives the tag 55 from the read request address 52. The tag compare logic 131 compares the tag from tag array 114 and the tag 55 from the read request. If the two tags match, the tag compare logic 131 asserts signal 165. Otherwise, the tag compare logic 131 deasserts signal 165.

In the full way line mode of operation, the assertion of signal 165 indicates a cache hit for data array 116 (i.e., indicates that the requested data is available in the data array 116). Further, in the full way line mode of operation, the hit logic 125 allows the signal 165 to pass through the hit logic 125 without change and to be output as signal 169. Thus, the requested data is available in data array 116 when the signals 165 and 169 are asserted.

The tag array 115 retrieves the tag stored in the entry identified by the received index 56, and the tag array 115 transmits the retrieved tag to tag compare logic 133, which also receives the tag 55 from the read request address 52. The tag compare logic 133 compares the tag from tag array 115 and the tag 55 from the read request. If the two tags match, the tag compare logic 133 asserts signal 175. Otherwise, the tag compare logic 133 deasserts signal 175.

In the full way line mode of operation, the assertion of signal 175 indicates a cache hit for data array 117 (i.e., indicates that the requested data is available in the data array 117). Further, in the full way line mode of operation, the hit logic 125 allows the signal 175 to pass through the hit logic 125 without change and to be output as signal 179. Thus, the requested data is available in data array 117 when the signals 175 and 179 are asserted.

If both signals 169 and 179 output from the hit logic 125 are deasserted, then a cache miss has occurred (i.e., the request data is not available in cache 25). Thus, the read request is transmitted to memory system 42 where the requested data is retrieved from memory 43 and then stored in cache 25 as a fill operation.

If, however, one of the signals 165 or 179 is asserted, then a cache hit has occurred. In such a situation, the cache 25 retrieves the requested data and transmits this data to processor 22. In this regard, the data array 116 in response to an asserted read signal 142 transmits to multiplexor 181 the way line stored in the entry identified by the index 55 being received by the array 116. Further, the data array 117 in response to an asserted read signal 142 transmits to multiplexor 181 the way line stored in the entry identified by the index 55 being received by the array 117. The multiplexor 181 then selects and transmits the way line from the data array 116 or 117 associated with the cache hit based on the signals 169 and 179 output from the hit logic 125. In particular, if signal 169 is asserted, the multiplexor 181 selects and transmits the way line from the data array 116. If signal 179 is asserted, the multiplexor 181 selects and transmits the way line from the data array 117. Further, a multiplexor 184 receives the way line transmitted from multiplexor 181. Based on the offset 57 of the address 52 included in the read request, the multiplexor 184 selects the requested data from the received way line and transmits this data to the processor 22. Thus, if there is a cache hit, the data requested by the read request is retrieved from cache 25 and transmitted to processor 22.

Operation of the cache 25 will now be described for the half way line mode of operation. In the half way line mode, the cache 25 of FIG. 4 operates essentially the same as in the full way line mode except as otherwise described below. Note that the mode signal 137 is deasserted to indicate that the cache 25 is to operate in the half way line mode instead of the full way line mode. In the half way line mode, half of the ways of each set are allocated to the upper way line halves, and the other half of the ways of each set are allocated to the lower way line halves. In the instant embodiment, way 1 is allocated to the upper way line halves, and way 0 is allocated to the lower way line halves.

In a fill operation, the cache 25 receives a memory line, representing half of a way line, and an address 52 from system interface 36, and the fill signal 144 is asserted. If the way line half received from system interface 36 is an upper half of a way line, then the fill logic 122 ensures that the way line half is stored in a way allocated to upper way line halves. In the instant embodiment, way 1 is the only way allocated to upper way line halves. Thus, the fill logic 122 ensures that the way line half is stored in way 1 of the set identified by the index 56 in the received address 52. The foregoing is achieved by deasserting fill signals 152 and 153 while asserting signals 154 and 155 when the most significant bit of the offset 57 is asserted. If multiple ways of the identified set are allocated to the upper way line halves in other embodiments, then the fill logic 122 may employ a replacement algorithm to select one of these ways for the storage of the way line half.

If the way line half received from system interface 36 is a lower half of a way line, then the fill logic 122 ensures that the way line half is stored in a way allocated to lower way line halves. In the instant embodiment, way 0 is the only way allocated to lower way line halves. Thus, the fill logic 122 ensures that the way line half is stored in way 0 of the set identified by the index 56 in the received address 52. The foregoing is achieved by asserting fill signals 152 and 153 while deasserting signals 154 and 155 when the most significant bit of the offset 57 is deasserted. If multiple ways of the identified set are allocated to the lower way line halves in other embodiments, then the fill logic 122 may employ a replacement algorithm to select one of these ways for the storage of the way line half.

By implementing the foregoing techniques for fill operations, only upper way line halves are stored in data array 117, and only lower way line halves are stored in data array 116. Thus, each memory line, representing only a portion (i.e., half in the instant embodiment) of a way line, is partially associative within the set identified by the memory line's address.

When the cache 25 receives a read request from processor 22 while operating in the half way line mode, the tag compare logic 131 and 133 output signals 165 and 175 according to the techniques described above. The hit logic 125, however, automatically deasserts at least one of the signals 169 or 179 depending on whether the requested data is in the upper or lower half of a way line. In this regard, if the most significant bit of the offset 57 is asserted, then the requested data is in the upper half of a way line. In such an example, the hit logic 125 automatically deasserts signal 169 such that a cache hit for data array 116 does not occur. Note that data array 116 does not store upper way line halves in the current mode of operation, and it is, therefore, not possible for this array 116 to be storing the requested data. Thus, deasserting signal 169 ensures that a false cache hit for data array 116 does not occur.

If the most significant bit of the offset 57 is deasserted, then the requested data is in the lower half of a way line. In such an example, the hit logic 125 automatically deasserts signal 179 such that a cache hit for data array 117 does not occur. Note that data array 117 does not store lower way line halves in the current mode of operation, and it is, therefore, not possible for this array 117 to be storing the requested data. Thus, deasserting signal 179 ensures that a false cache hit for data array 117 does not occur.

In the half way line mode of operation, the multiplexor 181 selects one of the way lines from data arrays 116 and 117 based on the signals 169 and 179 in the same manner as described above for the full way line mode of operation. Further, the multiplexor 184 selects, based on the offset 57, the requested data from the output of multiplexor 181, and the multiplexor 184 transmits the requested data to the processor 22.

Figure 5:
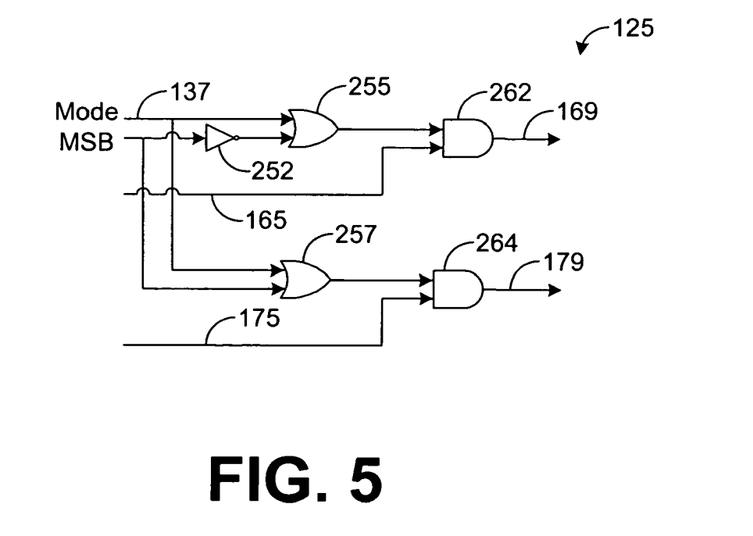
FIG. 5 is a circuit diagram illustrating an exemplary embodiment of hit logic depicted in FIG. 4.

FIG. 5 depicts exemplary circuitry that may be used to implement the hit logic 125. The circuitry of FIG. 5 comprises an inverter 252, two OR gates 255 and 257, and two AND gates 262 and 264. The mode signal 137 is provided as an input to OR gates 255 and 257. Further, the most significant bit (MSB) of the offset 57 is provided as an input to OR gate 257 and is provided as an input to OR gate 255 after passing through the inverter 252. The output of OR gate 255 is provided as an input to AND gate 262 along with the output signal 165 of tag compare logic 131 (FIG. 4), and the output of OR gate 257 is provided as an input to AND gate 264 along with the output signal 175 of tag compare logic 133 (FIG. 4). The AND gates 262 and 264 respectively output the signals 169 and 179 used to control the multiplexor 181 (FIG. 4).

According to the circuitry shown by FIG. 5, the most significant bit of the offset 57 has no effect on the output of AND gates 262 and 264 when the cache 25 is operating in the full way line mode (i.e., when the mode signal 137 is asserted). In such a mode of operation, the signal 169 output by AND gate 262 matches the input signal 165 from tag compare logic 131, and the signal 179 output by AND gate 264 matches the input signal 175 from tag compare logic 133. However, in the halfway line mode, the most significant bit of the offset 57 controls which of signals 169 and 179 may be asserted and, therefore, indicate a cache hit. In this regard, if the most significant bit of the offset 57 is asserted, then only the signal 179 associated with the data array 117 storing upper way line halves may be asserted and, therefore, indicative of a cache hit. However, if the most significant bit of the offset 57 is deasserted, then only the signal 169 associated with the data array 116 storing lower way line halves may be asserted and, therefore, indicative of a cache hit.

An exemplary architecture and functionality of the cache 25 while servicing a read request during the half way line mode of operation will now be described with particular reference to FIGS. 6 and 7. For illustrative purposes, assume that way 0 is allocated to lower way line halves and that way 1 is allocated to upper way line halves, as described above. Further assume that a read request from processor 22 requests data that is within an upper half of a way line, referred to as "identified way line," stored in one of the memory blocks 49. Also assume that the requested data is stored in way 1 when the cache 25 receives the read request from processor 22.

Figure 6:
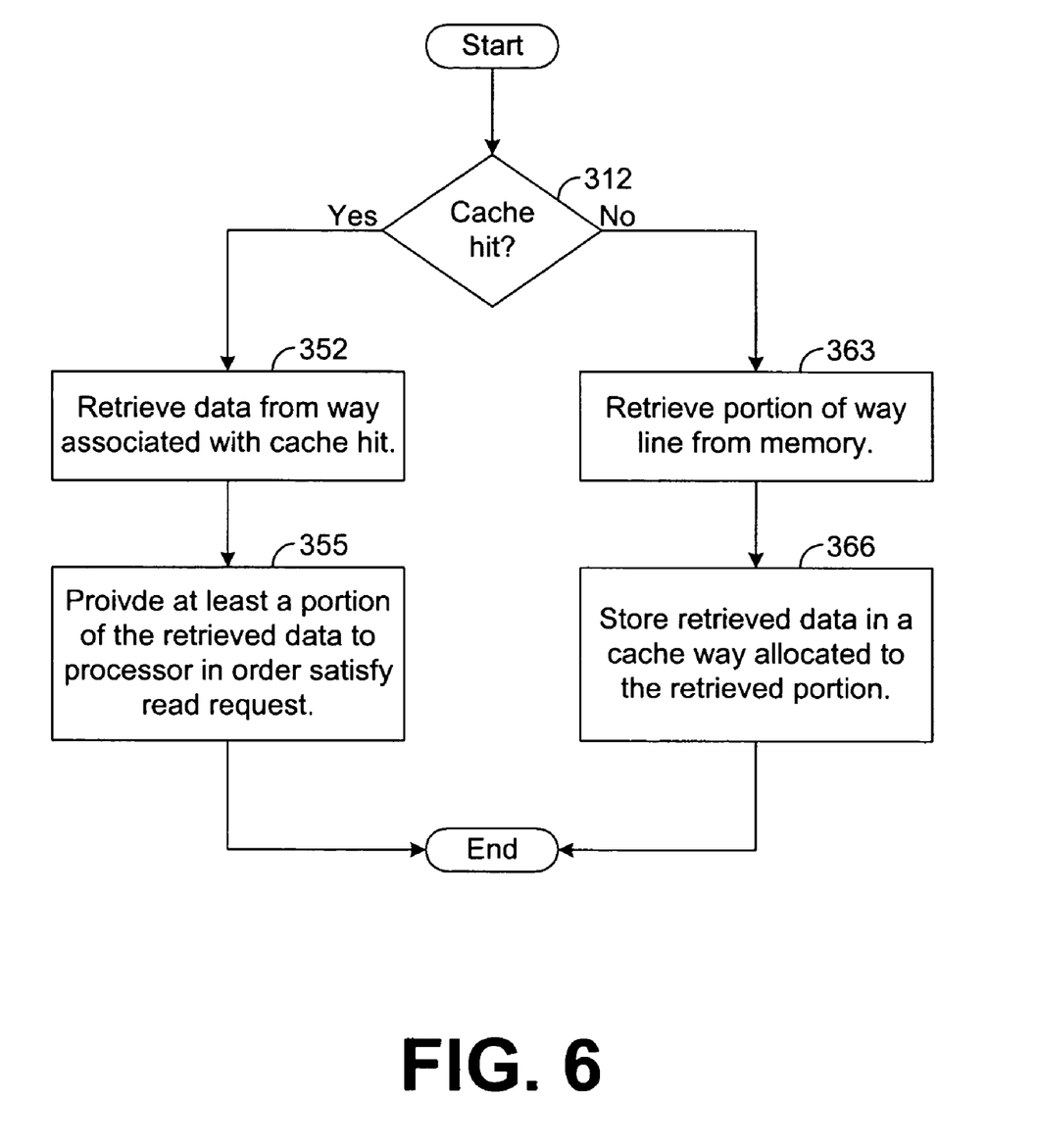
FIG. 6 is a flow chart illustrating an exemplary methodology implemented by the cache memory system depicted by FIG. 1 in responding to a read request.
Figure 7:
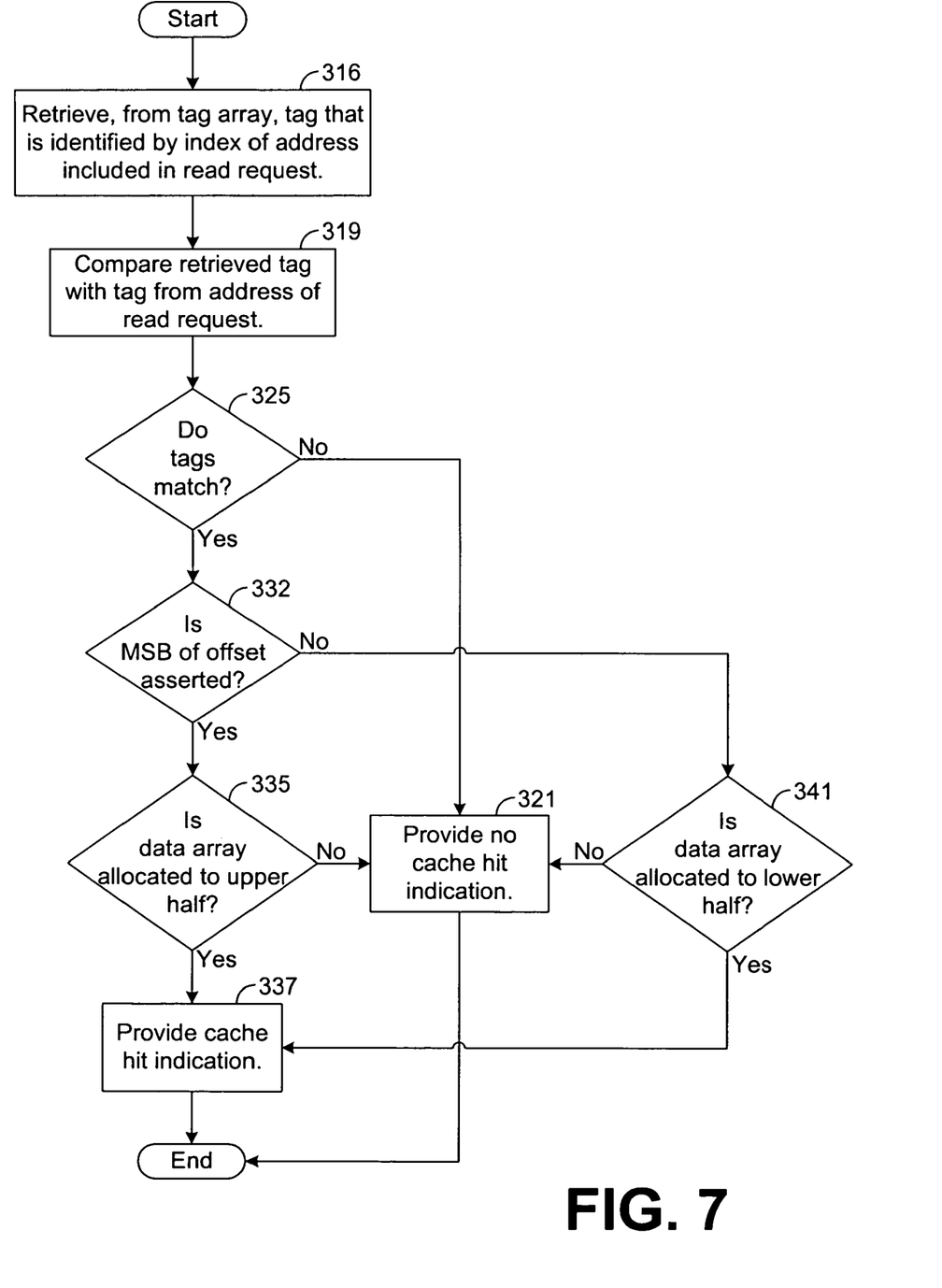
FIG. 7 is a flow chart illustrating an exemplary methodology implemented by the cache memory system depicted by FIG. 1 in determining whether or not to provide a cache hit determination in response to a read request.

In response to the read request, the cache 25 determines whether there is a cache hit or, in other words, determines whether the requested data is available in the cache 25, as shown by block 312 of FIG. 6. To determine whether there is a cache hit, the cache 25 performs the process depicted by FIG. 7 for each way 0 and 1. Note that signal 169 of FIG. 4 indicates whether there is a cache hit associated with data array 116, and signal 179 indicates whether there is a cache hit associated with data array 117.

Thus, for way 0, the index 56 of the address 52 in the read request is provided to tag array 114. The tag array 114 retrieves and outputs to tag compare logic 131 the tag stored in the entry identified by the index 56, as indicated by block 316 of FIG. 7. The tag compare logic 131 then compares the retrieved tag to the tag 55 of the address 52 included in the read request, as indicated by block 319. If the two tags do not match, then data array 116 is not storing data from the identified way line. Thus, a no tag hit indication is provided as shown by blocks 325 and 327. In particular, the tag compare logic 131 deasserts signal 165, which forces signal 169 to be deasserted.

If the two tags match, then a "yes" determination is made in block 325, and the data array 116 is storing data from the identified way line. However, since data array 116 is allocated to lower way line halves, data array 116 is not storing the requested data. In this regard, the data array 116 is storing the lower half of the identified way line, and the requested data is within the upper half of the identified cache. Moreover, in block 332, the hit logic 125 determines whether the most significant bit of the offset 57 is asserted. Since the requested data is in the upper half of the identified way line, the most significant bit of the index 57 is indeed asserted. Thus, hit logic 125 provides a cache hit indication for way 0 only if the data array 116 is allocated to upper way line halves, as shown by blocks 335 and 337. However, since data array 116 is allocated to lower way line halves, a "no" determination is made in block 335, and block 321 is, therefore, performed instead of block 337. Thus, the hit logic 125 deasserts signal 169 thereby indicating that data array 116 and, therefore, way 0 are not associated with a cache hit. Note that if the most significant bit of the index 57 had been deasserted, then a cache hit indication for data array 116 and, therefore, way 0 would have been provided by asserting signal 169, as indicated by blocks 341 and 337.

For way 1, the index 56 of the address 52 in the read request is provided to tag array 115. The tag array 115 retrieves and outputs to tag compare logic 133 the tag stored in the entry identified by the index 56, as indicated by block 316 of FIG. 7. The tag compare logic 133 then compares the retrieved tag to the tag 55 of the address 52 included in the read request, as indicated by block 319. Since the requested data is in the data array 117, the two tags should match. Thus, the tag compare logic 133 makes a "yes" determination in block 325 and asserts signal 175, which enables the signal 179 to be asserted by the hit logic 125.

Moreover, in block 332, the hit logic 125 determines whether the most significant bit of the offset 57 is asserted. As indicated above, the most significant bit of the index 57 is indeed asserted since the requested data is in the upper half of the identified way line. Since data array 117 is allocated to upper way line halves, a "yes" determination is made in block 335, and block 337 is, therefore, performed instead of block 321. Thus, the hit logic 125 asserts signal 179 thereby indicating that data array 117 and, therefore, way 1 are associated with a cache hit.

Since at least one of the data arrays 116 or 117 is associated with a cache hit, a "yes" determination is made in block 312 of FIG. 6. Accordingly, the requested data is retrieved from the data array 117 associated with the cache hit, as indicated by block 352 of FIG. 6. In this regard, the index 56 is provided to the data array 117. The data array 117 retrieves and transmits to multiplexor 181 the data in the data array entry identified by the index 56. Note that this data includes the lower half of the identified way line. Since signal 179 is asserted, as described above, the multiplexor 181 selects the data output by the data array 117 and transmits this data to the multiplexor 184. In block 355, the multiplexor 184 uses the offset 57 to select only the data byte or bytes requested by the read request and to transmit this data byte or bytes to the processor 22. Thus, the requested data is provided to the processor 22 without having to submit a read request to memory system 42.

Note that if the requested data had not been stored in the cache 25, then a cache hit indication would not have been provided for any of the data arrays 116 and 117. In such an example, a "no" determination would have been made in block 312 of FIG. 6, and the requested data would have been retrieved from the memory system 42, as indicated by block 363. Further, a fill operation would have preferably been performed for the lower half of the identified way line, as indicated by block 366, in order to store the lower way line half in the cache 25. However, performing a fill operation for the upper half of the identified way line would not be necessary unless data within the upper way line half is actually requested by a subsequent read request.

It should be noted that, in an exemplary embodiments described above, the system 20 has generally been described as accommodating memory line sizes of n or n/2 bytes. However, the system 20 may be configured to accommodate any number of memory line sizes. For example, the system 20 can be configured to accommodate n, n/2, and n/4 byte memory lines sizes. In such an embodiment, one-fourth of the ways of cache 25 may be allocated to a different way line portion when the system 20 is accommodating n/4 byte memory line sizes, and the most significant two bits of the offset 57 may be used to select the appropriate way to which to store a way line portion received from system interface 36. Further, the mode signal 137 may comprise at least two bits to indicate whether the system 20 is operating in a mode for accommodating n, n/2, or n/4 byte memory line sizes.

We claim:

1. A cache memory system capable of adaptively accommodating various memory line sizes, comprising:
cache memory having sets of ways; and
cache logic configured to transmit a read request in response to a cache miss, the read request having an address identifying a memory line to be retrieved from external memory in response to the read request and to be transmitted to the cache logic, the memory line identified by the address representing only a portion of a way line for a single set, the cache logic configured to select one of the ways for storing the memory line based on which portion of the way line is represented by the memory line identified by the address, the cache logic further configured to store, in the selected way, the memory line identified by the address, wherein the cache logic is capable of operating in at least a first mode of operation and a second mode of operation, the cache logic configured to receive a first plurality of memory lines if operating in the first mode of operation and to receive a second plurality of memory lines if operating in the second mode of operation, each of the first plurality of memory lines having a first size and each of the second plurality of memory lines having a second size different than the first size, wherein the cache logic is configured such that each of the first plurality of memory lines is assigned to and fully associative within a respective one of the sets identified by the address, and wherein the cache logic is configured such that each of the second plurality of memory lines is assigned to and partially associative within a respective one of the sets identified by the address.

2. The system of claim 1, wherein the cache logic is further configured to ensure that a remaining portion of the way line is not written to the selected way.

3. The system of claim 1, wherein the cache logic is configured to select the selected way from a first plurality of ways if the memory line identified by the address represents an upper portion of the way line, and wherein the cache logic is configured to select the selected way from a second plurality of ways if the memory line represents a lower portion of the way line.

4. The system of claim 1, wherein the cache logic is configured to allocate a first plurality of ways to upper way line portions and to allocate a second plurality of ways to lower way line portions, the cache logic further configured to ensure that the selected way is allocated to the way line portion represented by the memory line identified by the address.

5. The system of claim 1, wherein the address has a tag and an index, and wherein the cache logic comprises tag compare logic configured to transmit a hit signal having a value based on whether the cache memory is storing data from a memory block identified by the tag and index, and wherein the cache logic further comprises hit logic configured manipulate the hit signal based on whether data from the memory block and stored in the cache memory corresponds to the memory line.

6. A cache memory system capable of adaptively accommodating various memory line sizes, comprising:
cache memory having sets of ways; and
cache logic capable of operating in at least a first mode of operation and a second mode of operation, the cache logic configured to receive a first plurality of memory lines if operating in the first mode of operation and to receive a second plurality of memory lines if operating in the second mode of operation, each of the first plurality of memory lines having a first size and each of the second plurality of memory lines having a second size different than the first size, wherein the cache logic is configured such that each of the first plurality of memory lines is assigned to and fully associative within a respective one of the sets identified by an address of the respective memory line, and wherein the cache logic is configured such that each of the second plurality of memory lines is assigned to and partially associative within a respective one of the sets identified by an address of the respective memory line.

7. The system of claim 6, wherein the cache logic is configured to receive a mode signal and to operate in one of the modes of operation based on the mode signal.

8. The system of claim 6, wherein the cache logic is configured to ensure that memory lines from a single block of memory are respectively stored to different ways of the same set when operating in the second mode of operation.

9. The system of claim 8, wherein each of the memory lines from the single block of memory is associated with an address having a tag and an index identifying the single block of memory.

10. A method for adaptively accommodating various memory line sizes within cache memory systems, comprising the steps of:
receiving a memory line in a cache memory system, the cache memory system having sets of ways and capable of operating in at least a first mode of operation and a second mode of operation;
storing the memory line in one of the ways of one of the sets based on an address associated with the memory line, the one set identified by an index of the address;
determining whether the cache memory system is operating in the first or the second mode of operation;
controlling, if the cache memory system is operating in a first mode of operation, the cache memory system such that the memory line is fully associative within the one set based on the determining step; and
controlling, if the cache memory system is operating in a second mode of operation, the cache memory system such that the memory line is partially associative within the one set based on the determining step.

11. The method of claim 10, further comprising the step of receiving a mode signal indicating a mode of operation of the cache memory system, wherein the determining step is based on the mode signal.

12. The method of claim 10, further comprising the step of ensuring that memory lines from a single block of memory are respectively stored to different ways of the same set when the cache memory system is operating in the second mode of operation.

13. The method of claim 10, further comprising the steps of:
requesting the memory line in response to a cache miss, the memory line representing a portion of a way line; and
selecting the one way based on which portion of the way line is represented by the memory line,
wherein the storing step is based on the selecting step.

14. The method of claim 13, wherein the address has a tag and an index, the method further comprising the steps of:
transmitting a hit signal having a value based on whether the cache memory is storing data from a memory block identified by the tag and index; and
manipulating the hit signal based on the determining step.

15. The method of claim 14, wherein the manipulating step is further based on whether data from the memory block and stored in the cache memory corresponds to the memory line.

* * * * *

UNITED STATES PATENT AND TRADEMARK OFFICE
CERTIFICATE OF CORRECTION

PATENT NO. : 7,543,113 B2
APPLICATION NO. : 10/883860
DATED : June 2, 2009
INVENTOR(S) : Shawn Walker et al.

It is certified that error appears in the above-identified patent and that said Letters Patent is hereby corrected as shown below:

On the Title page, in field (75), in column 1, line 3, delete "Karl Brummel" and insert -- Karl P. Brummel --, therefor.

Signed and Sealed this

Twenty-second Day of September, 2009

David J. Kappos
*Director of the United States Patent and Trademark Office*